US012746623B2

(12) United States Patent
Matsuo et al.

(10) Patent No.: US 12,746,623 B2
(45) Date of Patent: Sep. 29, 2026

(54) LASER BEAM MACHINE

(71) Applicant: TOYOTA JIDOSHA KABUSHIKI KAISHA, Toyota (JP)

(72) Inventors: Ryuta Matsuo, Nagakute (JP); Takeshi Yamamoto, Nisshin (JP); Takashi Motoyoshi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 805 days.

(21) Appl. No.: 18/105,495

(22) Filed: Feb. 3, 2023

(65) Prior Publication Data

US 2023/0264301 A1 Aug. 24, 2023

(30) Foreign Application Priority Data

Feb. 21, 2022 (JP) ................................ 2022-024686

(51) Int. Cl.

*B23K 26/70* (2014.01)
*B23K 26/03* (2006.01)
*B23K 26/14* (2014.01)
*B23K 26/142* (2014.01)

(52) U.S. Cl.

CPC .......... *B23K 26/706* (2015.10); *B23K 26/032* (2013.01); *B23K 26/14* (2013.01); *B23K 26/142* (2015.10)

(58) Field of Classification Search

CPC .............................. B23K 26/14; B23K 26/142
See application file for complete search history.

(56) References Cited

U.S. PATENT DOCUMENTS

| | | | | |
|---|---|---|---|---|
| 7,505,504 B2 * | 3/2009 | Sakai | B23K 26/037 | 372/60 |
| 7,605,345 B2 * | 10/2009 | Fukuda | B23K 26/702 | 219/121.84 |
| 11,052,483 B2 * | 7/2021 | Nakagawa | B23K 26/1488 | |
| 11,103,954 B2 * | 8/2021 | Akahoshi | B23K 26/244 | |
| 2008/0031298 A1 | 2/2008 | Sakai et al. | | |
| 2012/0080413 A1 | 4/2012 | Kishino et al. | | |
| 2018/0345406 A1 | 12/2018 | Nakamura et al. | | |
| 2019/0118291 A1 | 4/2019 | Nakagawa et al. | | |
| 2019/0160592 A1 | 5/2019 | Akahoshi et al. | | |

FOREIGN PATENT DOCUMENTS

| | | |
|---|---|---|
| JP | 2012-076111 A | 4/2012 |
| JP | 2018-202441 A | 12/2018 |
| WO | 2006/038678 A1 | 4/2006 |
| WO | 2017/203862 A1 | 11/2017 |
| WO | 2017/209086 A1 | 12/2017 |
| WO | 2019/230193 A1 | 12/2019 |

* cited by examiner

*Primary Examiner* — Lorne E Meade
(74) *Attorney, Agent, or Firm* — Sughrue Mion, PLLC

(57) ABSTRACT

The laser beam machine includes: a laser emitting system for emitting a laser beam, wherein the laser emitting system has a protective glass capable of transmitting the laser beam; and a housing attached to the laser emitting system. The housing includes, a first end facing the laser emitting system, a second end opposite to the first end, and a first blowing portion located over an entire circumference of an interior of the first end. The first blowing portion blows a gas toward a central axis of the housing.

13 Claims, 11 Drawing Sheets

LASER BEAM MACHINE

CROSS-REFERENCE TO RELATED APPLICATIONS

The present application claims priority from Japanese Patent Application No. 2022-024686, filed on Feb. 21, 2022, the entirety of the content of which is hereby incorporated by reference into this application.

BACKGROUND

Field

The present disclosure relates to a laser beam machine.

Related Art

In order to prevent the sputter coming scattered from the processing point during laser welding collides with the mirror and/or lens of the laser optical system, a laser welding apparatus in which a protective glass is disposed at the laser scanner is known (e.g., see Japanese Unexamined Patent Application Publication No. JP 2018-202441). This laser welding apparatus prevents the adhering sputtering to the protective glass by flowing air in a direction across the optical path of the laser beam.

However, the conventional techniques may not be able to completely protect the adhesion of foreign matter to the protective glass. As a result, replacement of the protective glass may be required. Therefore, there has been a demand for a technique for improving adhesion of foreign matter to the protective glass.

SUMMARY

According to one aspect of the present disclosure, a laser beam machine is provided. The laser beam machine includes: a laser emitting system for emitting a laser beam, wherein the laser emitting system has a protective glass capable of transmitting the laser beam; and a housing attached to the laser emitting system. the housing includes, a first end facing the laser emitting system, a second end opposite to the first end, and a first blowing portion located over an entire circumference of an interior of the first end, and wherein the first blowing portion blows a gas toward a central axis of the housing.

According to the laser beam machine of this aspect, it is possible to generate an airflow covering the protective glass in the inner space of the housing, it can be suppressed or prevented from foreign matter such as spatter and/or fume collides with the protective glass.

DETAILED DESCRIPTION

A. First Embodiment

Figure 1:
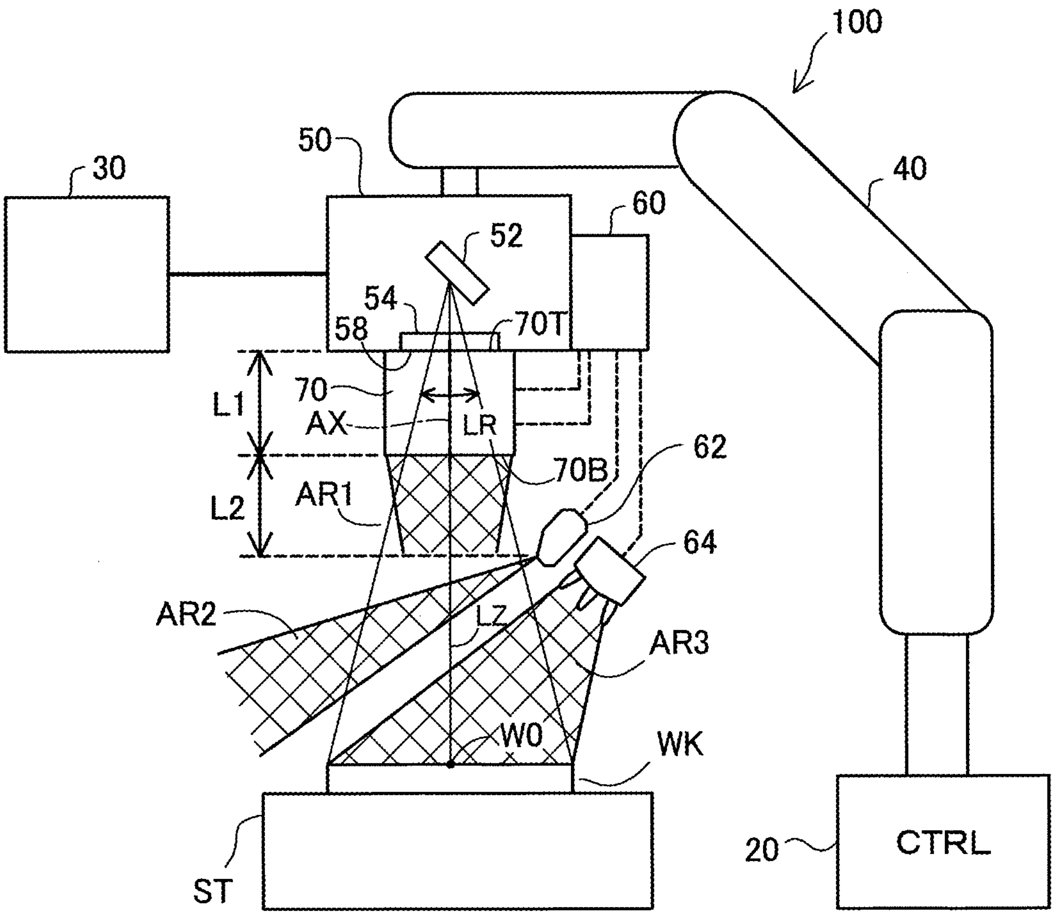
FIG. 1 illustrates a schematic configuration of a laser welding apparatus according to the present embodiment in a front view.

FIG. 1 illustrates a schematic configuration of a laser welding apparatus 100 as a laser beam machine according to the present embodiment in a front view. The Laser welding apparatus 100 is, for example, a remote laser device used in a manufacturing process for manufacturing automobile bodies. The laser welding apparatus 100, for example, welds a work WK by irradiating a laser beam to the work WK placed on a stage ST. The work WK is, for example, a plurality of steel plates superimposed on each other. The laser welding apparatus 100 includes a laser oscillator 30, a laser scanner 50, an air supply unit 60, a housing 70, a first airflow generating unit 62, and a second airflow generating unit 64.

The laser oscillator 30 generates laser beam and guides the laser beam to the laser scanner 50 through an optical fiber cable or the like. The Laser generator 30, for example, CO2 lasers, YAG lasers, fiber lasers, disc lasers, it is possible to generate a laser beam such as excimer lasers.

The Laser scanner 50 functions as a laser emitting system, the laser emitting unit emits a laser beam guided from the laser oscillator 30 through the emission port 58. The laser scanner 50 may also be referred to as a scanner head. The laser scanner 50 includes a laser optical system and a protective glass 54. The laser optical system includes, for example, a mirror 52 such as a galvano mirror and a lens group (not shown). The lens group includes, for example, collimating lens for collimating the laser beam into a collimated light, and a condenser lens for focusing the laser beam to the processing point W0 on the work WK. Incidentally, in FIG. 1, the optical path LZ of the laser beam from the mirror 52 to the work WK is shown schematically.

The mirror 52, for example, is mounted rotatably about an axis. The Laser welding apparatus 100 is able to scan the laser beam in a predetermined range LR shown in FIG. 1 by operating the rotation of the mirror 52, even while fixing the laser scanner 50. In the present disclosure, the distance from the mirror 52 to the processing point W0 on the work WK, also referred to as a "focal length".

The protective glass 54 is arranged at the emission port 58 in the laser scanner 50. The protective glass 54 can transmit laser beam from the optical system. The protective glass 54 prevents the spatters coming scattered from the processing point W0 on the work WK, and the fumes sublimated metallic contained in the work WK from colliding with the mirror 52 and the lens group during the laser processing.

The protective glass 54, foreign matter such as the spatters and fumes may be attached. When the foreign matter adheres to the protective glass 54, the focal length of the laser beam may change due to the thermal lens effect. The "thermal lens effect" is a phenomenon in which refractive index of the protective glass 54 changes due to thermal expansion of the protective glass 54, the thermal expansion is caused by foreign matter attached to the protective glass 54 absorbing the laser beam and generating heat. Consequently, the Laser welding apparatus 100 may not be able to properly converge the laser beam to the processing point W0 on the work WK.

In this embodiment, the laser scanner 50 is coupled to a robot 40. The robot 40 has a so-called articulated arm. The articulated arms are sequentially connected in multiple joints including bending joints and torsional joints. The robot 40 is controlled by the robot controller 20. The robot controller 20, for example, such as the rotation angle and movement amount of the arm, information for moving the laser scanner 50 to an arbitrary position is stored. The robot 40 adjusts the position of the laser scanner 50 relative to the work WK in accordance with a control signal from the robot controller 20. The robot 40 may have any mechanism arm with one or more joints. However, the laser scanner 50 does not necessarily need to be coupled to the robot 40. For example, the robot 40 may be omitted and the laser scanner 50 may be a stationary type.

The housing 70 is a generally cylindrical metallic member which is attached to the laser scanner 50. The housing 70 is mounted near an emission port 58 of the laser scanner 50. The housing 70 is disposed so as to cover the emission port 58 and the protective glass 54 to suppress or prevent adhesion of foreign matter such as the spatters or the fumes to the protective glass 54. The housing 70 is not limited to a metal, it may be made of resin or ceramic. The housing 70 is not limited to a cylindrical shape, and may have a rectangular tubular shape with a polygonal cross section, and may have any cylindrical shape capable of passing laser beam through the internal space.

The inner wall of the housing 70 defines the interior space of the housing 70. The axis passing through the interior space of the housing 70 is also referred to as the "central axis AX." The inner wall of the housing 70 is provided so as to surround the optical path LZ of the laser beam emitted from the emission port 58 passes through the protective glass 54. In other words, the housing 70 is attached to the emission port 58 of the laser scanner 50 so that the laser beam emitted from the laser scanner 50 can pass through the internal space of the housing 70. In the following description, the direction along the central axis AX is also referred to as the "axial direction", the direction along the outer edge of the housing 70 around the central axis AX in a plane perpendicular to the axial direction is also referred to as the "circumferential direction of the housing 70". At each end of the housing 70 along the central axis AX, the end facing the laser scanner 50 and the protective glass 54 is also referred to as a first end 70T and the end opposite the first end 70T is also referred to as a second end 70B. The second end 70B faces the work WK during processing.

In the present embodiment, the housing 70, as described later, the flow path for circulating gas is provided. The gas supplied to the housing 70 generates an airflow AR1 shown in FIG. 1 by being blown from a predetermined position of the housing 70. The airflow AR1 is generated in the interior space of the housing 70 and a predetermined area from the second end 70B toward the work WK. If a region of negative pressure exists in the interior space of the housing 70, it may be a factor to suck in foreign matter such as spatters and fumes. Therefore, in order to more effectively suppress the adhesion of foreign matter to the protective glass 54, it is preferable that the entire airflow AR1 has a uniform pressure. Incidentally, in FIG. 1, the airflow AR1, AR2, AR3 are hatched in order to facilitate understand of the technique.

The first airflow generating unit 62 generates a high-speed high-pressure airflow AR2 shown in FIG. 1. The first airflow generating unit 62 may also be referred to as an "air knife". The first airflow generating unit 62 blows airflow AR2, the airflow AR2 is supplied substantially planar area in a direction intersecting the central axial AX of the housing 70. The airflow AR2 intersects the optical path LZ of the laser beam in any of the scope LR for scanning the laser beam. Thus, the sputtering scattered toward the laser scanner 50 from the processing point W0 is pushed by the airflow AR2 generated from the first airflow generating unit 62. As a result, it is possible to suppress or prevent the spatter from reaching the laser scanner 50. To suppress the foreign matter pushed by the airflow AR2 collides with the work WK, the airflow AR2 is preferably not overlapping with the work WK.

In the present embodiment, the first airflow generating unit 62, as shown in the distance L2 in FIG. 1, is arranged spaced apart from the second end 70B. Thus, the airflow AR1 generated in the interior space of the housing 70 is suppressed from being disturbed by the airflow AR2. In the present embodiment, the distance L2 from the second end 70B to the first airflow generating unit 62 is set to be equal to or more than the length L1 along the central axis AX of the housing 70. Incidentally, because the second airflow generating unit 64 is disposed at a position closer to the work WK than the first airflow generating unit 62, the second airflow generating unit 64 is arranged spaced apart in a further separated condition than the first airflow generating unit 62.

The second airflow generating unit 64 generates a high-speed high-pressure airflow AR3 shown in FIG. 1. The second airflow generating unit 64 blows out the airflow AR3 in a substantially conical area with a second airflow generating unit 64 as the apex, and the airflow AR3 covers the entire work WK. Thus, the fumes generated from the work WK during laser-welding is pushed by the airflow generated from the second airflow generating unit 64. As a result, it is possible to suppress or prevent the fume from reaching the laser scanner 50. The airflow AR2 and the airflow AR3, it is preferred that they do not overlap each other in order to suppress the airflow from interfering with each other and decreasing functionality. The second airflow generating unit 64 is arranged at a position closer to the work WK than the first airflow generating unit 62.

Air supply unit 60 can supply individually air to the first airflow generating unit 62, the second airflow generating unit 64, and the housing 70 by using the air pump (not shown). Note that, for example, the air supply unit 60 can supply other gases such as nitrogen instead of air.

Figure 2:
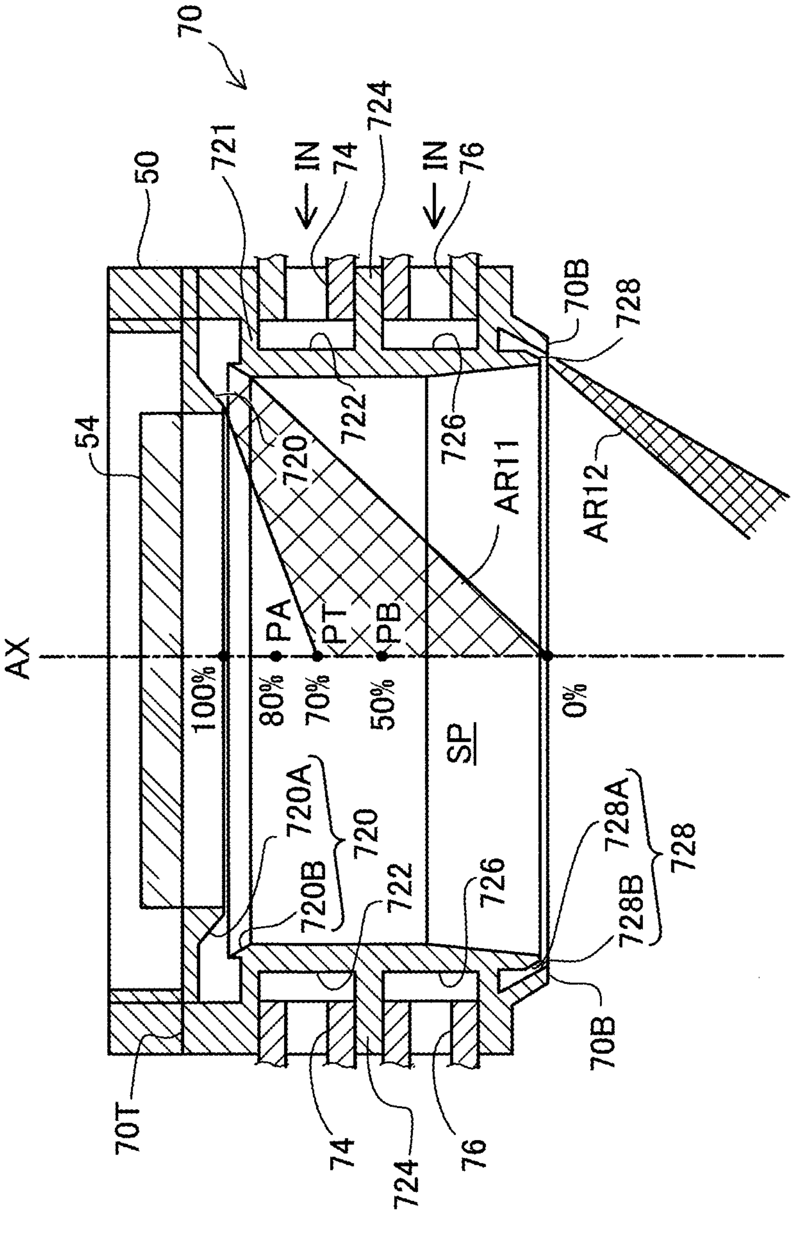
FIG. 2 illustrates an internal configuration of the housing in cross-section.

The flow path formed in the housing 70 will be described with reference to FIGS. 2 and 3. FIG. 2 illustrates an inside configuration of the housing 70 in cross-section. The housing 70 includes a first gas inlet 74, a first supply passage 722, and a first blowing portion 720. The first gas inlet 74, the first supply passage 722, and the first blowing portion 720 generate an airflow AR1 in the inner space SP of the housing 70 by using the air pumped from the air supply unit 60.

The first gas inlet 74 is connected to the air supply unit 60 shown in FIG. 1. The first gas inlet 74 is arranged substantially perpendicular to the outer wall surface of the housing 70. The first gas inlet 74 is connected to the first supply passage 722 inside the housing 70, and guides the air supplied from the air supply unit 60 to the first supply passage 722.

In the present embodiment, the housing 70 includes a plurality of first gas inlet 74. The plurality of first gas inlet 74 introduce air into the first supply passage 722 from a plurality of positions of the first supply passage 722. Although only two first gas inlets 74 are shown in FIG. 2, actually four first gas inlets 74 are provided. In the present embodiment, the four first gas inlet 74 are arranged on the outer wall surface of the housing 70 so as to be substantially equally spaced around the central axial AX. The first gas inlet 74 may be a singular number, it may be set in any number of two or more not limited to four.

The first supply passage 722 guides the air supplied from the first gas inlet 74 to the first blowing portion 720. The first supply passage 722 is one strip-shaped space formed over the entire circumference along the circumferential direction in the inside of the housing 70. "Inside of the housing 70" means between the inner wall surface of the housing and the outer wall surface of the housing 70. The first supply passage 722 distributes the pressure of air while guiding the air supplied from the first gas inlet 74 to the first blowing portion 720. Therefore, for example, as compared with the case where the first blowing portion 720 and the first gas inlet 74 are directly connected, the pressure of the entire flow path such as the first supply passage 722 can substantially equalize. The first supply passage 722 is not limited to the inside of the housing 70, for example, can be arranged on the outer wall surface of the housing 70. In this case, the first supply passage 722, for example, can be formed by attaching a conduit such as a hose or pipe to the outer wall surface of the housing 70.

The first blowing portion 720 blows the air guided from the first supply passage 722 toward the central axis AX of the housing 70 from the entire circumference inside the first end 70T. Airflow is generated in the inner space SP by the air blown out from the first blowing portion 720. In the present embodiment, the first blowing portion 720 is arranged over the entire circumference of the inner side of the first end 70T. The first blowing portion 720 is a single opening of the so-called slit-shaped. "The first blowing portion 720 is arranged at the first end 70T" also includes a state in which the first blowing portion 720 is arranged in the vicinity of the first end 70T. "The first blowing portion 720 is arranged at the first end 70T" also includes a state in which the first blowing portion 720 is spaced from the first end 70T. The predetermined distance can be defined, for example, a distance obtained by adding the thickness of the flow path of the first supply passage 722 and the thickness of the housing 70.

The air blown out from the first blowing portion 720 generates an airflow AR11 shown in FIG. 2. Airflow of airflow AR11 contributes to the generation of airflow AR1 shown in FIG. 1. The first blowing portion 720 is not limited to one slit, for example, may be a plurality of slits. Further, the first blowing portion 720, on the assumption that it can be blown at a substantially uniform pressure toward the inner space SP of the housing 70, can be any configuration. For example, the first blowing portion 720 may be a plurality of openings instead of the slit-shaped. In this case, the plurality of openings may be continuously arranged over the entire periphery of the first end 70T.

As shown in FIG. 2, the first blowing portion 720 includes a upper surface 720A close to the protective glass 54, and a lower surface 720B facing the upper surface 720A. The upper surface 720A can be adjusted the flow direction of the gas blown out from the first blowing portion 720 by adjusting the tilt angle with respect to the central axis AX. In the present embodiment, the upper surface 720A is inclined in the direction defined by the direction component toward the central axis AX, and the direction component away from the protective glass 54. Thus, the airflow AR11 is inclined in a direction from the first end 70T toward the second end 70B (direction away from the protective glass 54).

When the distance from the second end 70B on the central axis AX of the housing 70 to the upper surface 720A (hereinafter, also referred to as the height of the first blowing portion 720.) is defined as 100%, the flow direction of the gas preferably blown out from the first blowing portion 720 is any direction included from the position PA which is the distance of 80% of the height of the first blowing portion 720 to the position PB which is the distance of 50%. The gas blown out from the first blowing portion 720 can collide with each other on the central axis AX, and the airflow after the collision can flow toward the second end 70B. As a result, a local negative pressure in the inner space SP of the housing 70 is suppressed to occur. For example, when the airflow is blown out from the second end 70B toward a position further than the positional PA, the airflow blown out from the first blowing portion 720 easily collide with each other in a state of high-speed high pressure and in a state of not inclined. As a result, the airflow in the housing 70 may be disturbed. When the airflow is blown out from the first blowing portion 720 toward a position closer to the second end 70B than the position PB, the airflow blown out from the first blowing portion 720 is less likely to collide each other. As the result, the negative pressure is likely to occur on the central axis AX. Consequently, the foreign matter such as spatter and/or fume may be sucked up toward the protective glass 54 by the negative pressure of the central axial AX. In the present embodiment, the flow direction of the gas blown out from the first blowing portion 720 is set to the position PT which the distance is 70% of the height of the first blowing portion 720 so that more reliably suppress the generation of negative pressure in the inner space SP on the basis of the results of the fluid simulation.

The thickness of the airflow AR11 can be adjusted by adjusting the tilt angle of lower surface 720B of the first blowing portion 720. In the present embodiment, by tilting the lower surface 720B toward the second end 70B on the central axis AX, the thickness of the airflow AR11 is able to be relatively thick. For example, the thickness of the airflow AR11 is thicker than the thickness of the airflow AR12 shown in FIG. 2. Incidentally, the airflow AR11 may be set thinner, for example, may be the same thickness as the thickness of the airflow AR12.

In the present embodiment, the housing 70 further includes a partition wall 724, a second gas inlet 76, a second supply passage 726, and a second blowing portion 728. The second gas inlet 76, the second supply passage 726, and the second blowing portion 728 are functioned as a flow path different from the first gas inlet 74, the first supply passage 722, and the first blowing portion 720 by the partition wall 724. The second gas inlet 76, the second supply passage 726, and the second blowing portion 728 are blown an airflow from the second end 70B of the housing 70 to the outside of the housing 70 by using the air pumped from the air supply unit 60.

The second gas inlet 76 is connected to the air supply unit 60. The second gas inlet 76 is arranged at substantially perpendicular to the outer wall surface of the housing 70. The second gas inlet 76 is connected to the second supply passage 726 inside the housing 70. The second gas inlet 76 guides the air supplied from the air supply unit 60 to the second supply passage 726.

In the present embodiment, the housing 70 includes a plurality of second gas inlet 76. Air is supplied from the plurality of second gas inlet 76 to the second supply passage 726. Similarly to the first gas inlet 74, four second gas inlet 76 are arranged at substantially equal intervals around the central axis AX on the outer wall surface of the housing 70. However, the number of the second gas inlet 76 may not be the same as the number of the first gas inlet 74, and may be a single number or an arbitrary number of 2 or more.

The second supply passage 726 guides the air supplied from the second gas inlet 76 to the second blowing portion 728. In the present embodiment, the second supply passage 726 is one strip-shaped space formed over the entire circumference along the circumferential direction in the inside of the housing 70. However, the second supply passage 726 may be arranged on the outer wall surface of the housing 70.

The air guided from the second supply passage 726 is blown from the second blowing portion 728 toward the side opposite to the laser scanner 50. In the present embodiment, the second blowing portion 728 is arranged over the entire circumference of the inner side of the second end 70B, a single opening of the so-called slit-shaped. "The second blowing portion 728 is arranged at the second end 70B" also includes a condition in which the second blowing portion 728 is arranged in the vicinity of the second end 70B, the second blowing portion 728 from the second end 70B a predetermined distance may be arranged apart. The predetermined distance, for example, means the distance obtained by adding the thickness of the flow path of the second supply passage 726, and the thickness of the housing 70.

The air blown out from the second blowing portion 728 generates an airflow AR12 shown in FIG. 2. Airflow AR12, together with the airflow AR11, contributes to the generation of airflow AR1. The second blowing portion 728 is not limited to one slit, for example, may be a plurality of slits, may be a plurality of openings instead of the slit shape.

As shown in FIG. 2, the second blowing portion 728 includes a lower surface 728B leading to the second end 70B, and an upper surface 728A facing the lower surface 728B. The upper surface 728A and the lower surface 728B are inclined in a direction defined by a direction component from the second end 70B toward the central axis AX and a direction component from the second end 70B toward the opposite side to the laser scanner 50. Thus, the airflow AR12, is inclined from the second end 70B toward the work WK. However, not limited thereto, the second blowing portion 728 may be inclined in a direction defined by a direction component away from the central axis AX, and a direction component opposite to the laser scanner 50 from the second end 70B.

In the present embodiment, as shown in FIG. 2, the opening area of the second blowing portion 728 is set to be relatively small. Opening area of the second blowing portion 728 is, for example, smaller than the opening area of the first blowing portion 720. Therefore, the thickness of the generation range of the airflow AR12 may be thinner than the thickness of the generation range of the airflow AR11. Consequently, airflow AR12 blown out from the second blowing portion 728 can be a high-speed high pressure than the airflow AR11 blown out from the first blowing portion 720.

Figure 3:
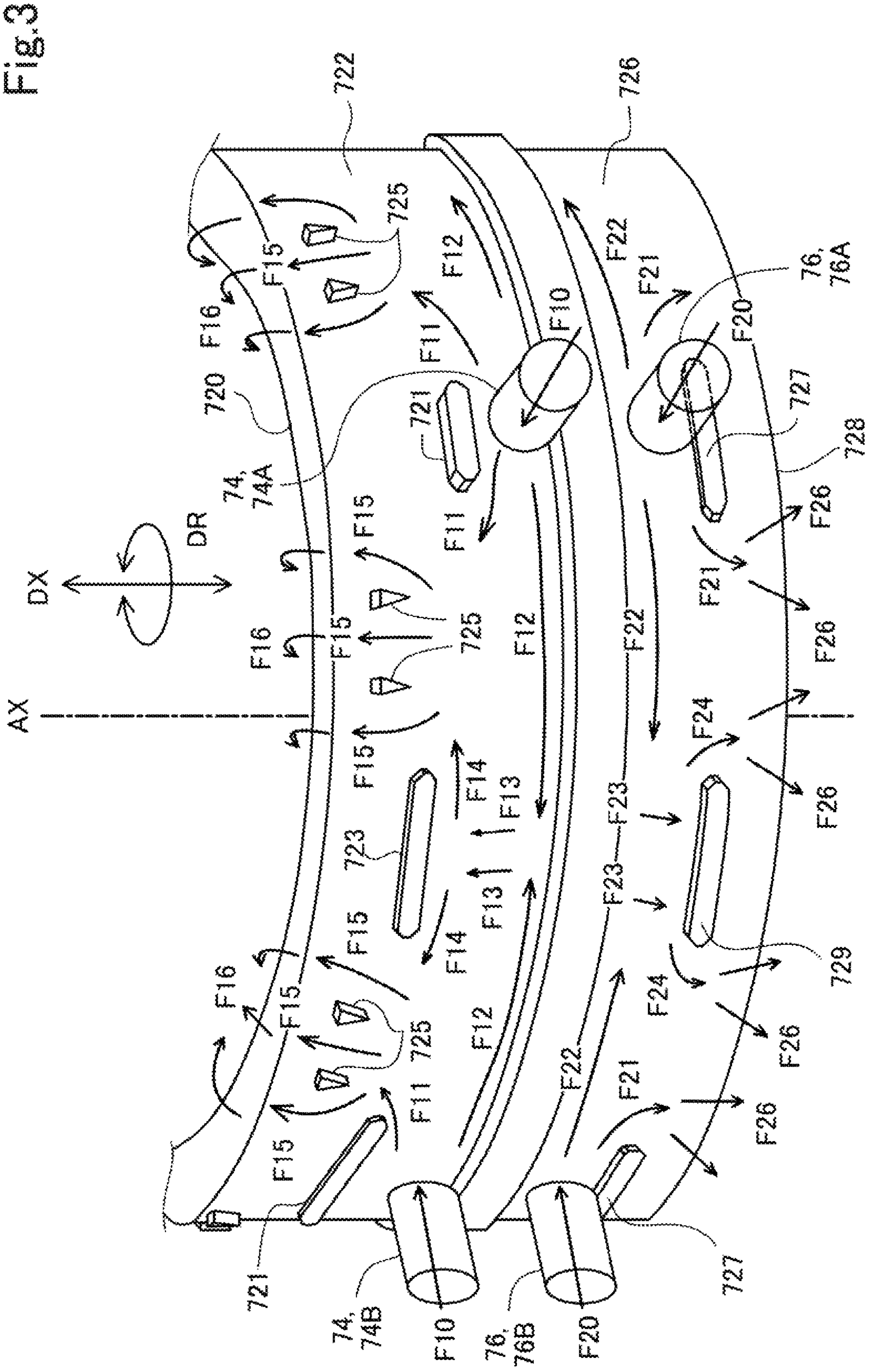
FIG. 3 illustrates the flow path of the gas in the housing.

FIG. 3 illustrates a flow path of the gas in the housing 70. FIG. 3 illustrates the structure of the first supply passage 722 and the second supply passage 726 in the housing 70 for convenience of illustration and the outer wall portion of the housing 70 is not shown. As shown in FIG. 3, in this embodiment, the first supply passage 722 and the second supply passage 726 is a two strip-shaped flow path formed along the circumferential direction of the housing 70, are arranged independently of each other by the partition wall 724.

As shown in FIG. 3, a plurality of distribution portions for dividing the airflow introduced from the first gas inlet 74 to the first supply passage 722 is formed at the first supply passage 722. Specifically, the first supply passage 722 includes a first distribution portion 721, a second distribution portion 723, and a third distribution portion 725. The first distribution portion 721, the second distribution portion 723, and the third distribution portion 725 functions differently from each other.

The first distribution portion 721 is arranged at the vicinity of each of the four first gas inlet 74. The second distribution portion 723 is arranged between the first gas inlet 74A and another first gas inlet 74B adjoining the first gas inlet 74A. In the present embodiment, the second distribution portion 723 is arranged at the middle of each of the first gas inlet 74. The first distribution portion 721 and the second distribution portion 723 has an elongated shape along the circumferential DR.

As shown in the directional F10, the air supplied from the air supply unit 60 is introduced from the first gas inlet 74A into the first supply passage 722 and collides with the surface of the first supply passage 722. Air introduced into the first supply passage 722 is divided by the first distribution portion 721 and the partition wall 724, as indicated by the directional F12, flows on both sides along the circumferential DR. At this time, part of the air flows toward between the first distribution portion 721 and the second distribution portion 723 as indicated by the directional F11.

Air flowing along the directional F12 collides with the air introduced from another first gas inlet 74B. The flow direction after collided is switched to the direction F13 intersecting the direction F12. Air flowing in the directional F13 is divided by the second distribution portion 723 and flows on both sides along the circumferential DR, as indicated by the directional F14. Air flowing in the directional F14 flows between the first distribution portion 721 and the second distribution portion 723 toward the first blowing portion 720.

The third distribution portion 725, in the first supply passage 722, is arranged at the position between the first distribution portion 721 and the second distribution portion 723, and is arranged at a boundary between the first supply passage 722 and the first blowing portion 720. A position of the third distribution portion 725 corresponds to a position in which the air flowing in the direction F11 and the air flowing in the direction F14 may collide with each other. In the present embodiment, the third distribution portion 725, as shown in FIG. 3, are provided two for each position. However, the number of the third distribution portion 725 may be one, not limited to two, and may be any number of three or more.

In the present embodiment, the shape of the third distribution portion 725 is substantially triangular. Bottom of triangular is arranged at the vicinity of the first blowing portion 720, the apex is arranged at a position away from the first blowing portion 720. The width in the circumferential DR of the third distribution portion 725 at a position close to the first blowing portion 720 is preferably larger than the width at a position away from the first blowing portion 720. The third distribution portion 725 is not limited to a substantially triangular shape, circular, elliptical, polygonal, may be any shape such as a rectangle. The third distribution portion 725 may be elongated shapes along the axial DX.

The air flowing from between the first distribution portion 721 and the second distribution portion 723 to the first blowing portion 720, as shown by the directional F15, is divided into a plurality of directions corresponded to the number of the third distribution portion 725 by the third distribution portion 725. Air guided from the divided plurality of positions to the first blowing portion 720, as shown by the directional F16, is blown out from the first blowing portion 720. Thus, the air introduced into the first supply passage 722 is divided by the first distribution portion 721, a second distribution portion 723, the third distribution portion 725, is guided to the first blowing portion 720 while repeating the collision of the air with each other. Consequently, the air guided to the first blowing portion 720, the pressure and flow velocity is substantially uniform over the entire circumference of the first end 70T, is blown from the first blowing portion 720 into the housing 70.

As shown in FIG. 3, the second supply passage 726 includes a plurality of distribution portions for dividing the air introduced from the second gas inlet 76 to the second supply passage 726. Specifically, the second supply passage 726 includes a fourth distribution portion 727 and a fifth distribution portion 729.

The fourth distribution portion 727 and the fifth distribution portion 729 has an elongated shape along the circumferential DR, and has the same functions as the first distribution portion 721 and the second distribution portion 723 described above. The fourth distribution portion 727, similarly to the first distribution portion 721, is arranged at the vicinity of each of the four second gas inlet 76. The fifth distribution portion 729, similarly to the second distribution portion 723, is arranged at intermediate between a first second gas inlet 76A and the other second gas inlet 76B adjoining the second gas inlet 76A.

As indicated by the directional F20, the air supplied from the air supply unit 60 is introduced from the second gas inlet 76A into the second supply passage 726 and collides with the surface of the second supply passage 726. Air introduced into the second supply passage 726 is divided by the fourth distribution portion 727 and the partition wall 724 and flows on both sides along the circumferential DR as indicated by the directional F22. At this time, a part of the air flows toward between the fourth distribution portion 727 and the fifth distribution portion 729 as indicated by the directional F21.

The direction of air flowing along the directional F22 is switched to the direction F23 intersecting the direction F22 by colliding with the air introduced from the second gas inlet 76B. Air flowing in the directional F23 is divided by the fifth distribution portion 729 and, as indicated by the directional F24, is divided to both sides along the circumferential DR and flows between the fourth distribution portion 727 and the fifth distribution portion 729 toward the second blowing portion 728. Thus, the air introduced into the second supply passage 726 is divided by the fourth distribution portion 727 and the fifth distribution portion 729, is guided to the second blowing portion 728 while repeating the collision between the air. Consequently, the air guided to the second blowing portion 728, as shown by the directional F26, in a condition in which the pressure and flow velocity are substantially uniform over the entire circumference of the second end 70B, is blown from the second blowing portion 728 to the outside of the housing 70.

Figure 4:
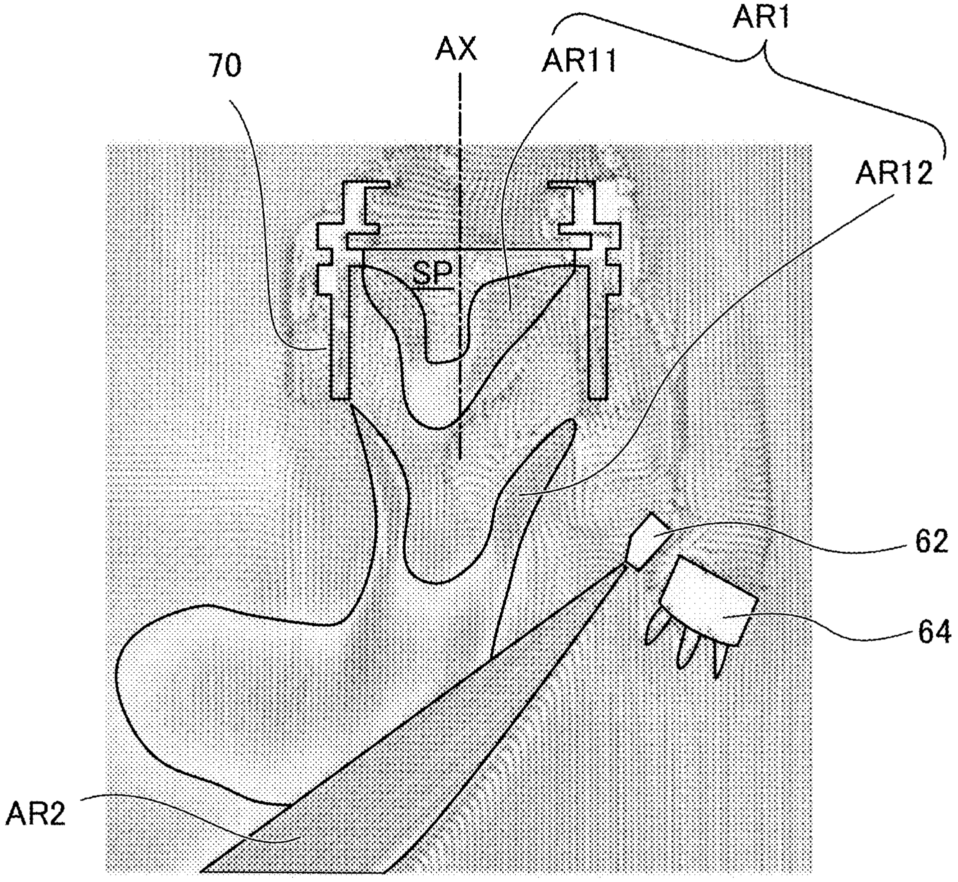
FIG. 4 is a first explanatory view showing the results of a fluid simulation using the laser welding apparatus of the present embodiment.

FIG. 4 is a first explanatory view showing a result of performing a fluid simulation using the laser welding apparatus 100 of this embodiment. "Fluid Simulation" is, for example, a fluid analysis utilizing CFD (Computational Fluid Dynamics) using a computer. FIG. 4 shows the simulation results in a cross-sectional view of the housing 70 in the laser welding apparatus 100. The simulated velocity (in units of m/s, for example) is shown in 20 steps by the difference in color. For example, the point where the flow velocity is slow is indicated by blue, the point where the flow velocity is faster than it is indicated by green, and the point where the flow velocity is faster is indicated by red. In FIG. 4, for convenience of explanation, a portion where the flow velocity is from the fastest to the fifth fastest stage speed are illustrated by enclosing a solid line. Incidentally, each simulation results in the present disclosure are a result of the second airflow generating unit 64 was turned off. As shown in FIG. 4, according to the simulation results, it can be understood that the faster flow velocity regions substantially coincides with the respective shapes of the airflow AR11, the airflow AR12, and the airflow AR2.

Figure 5:
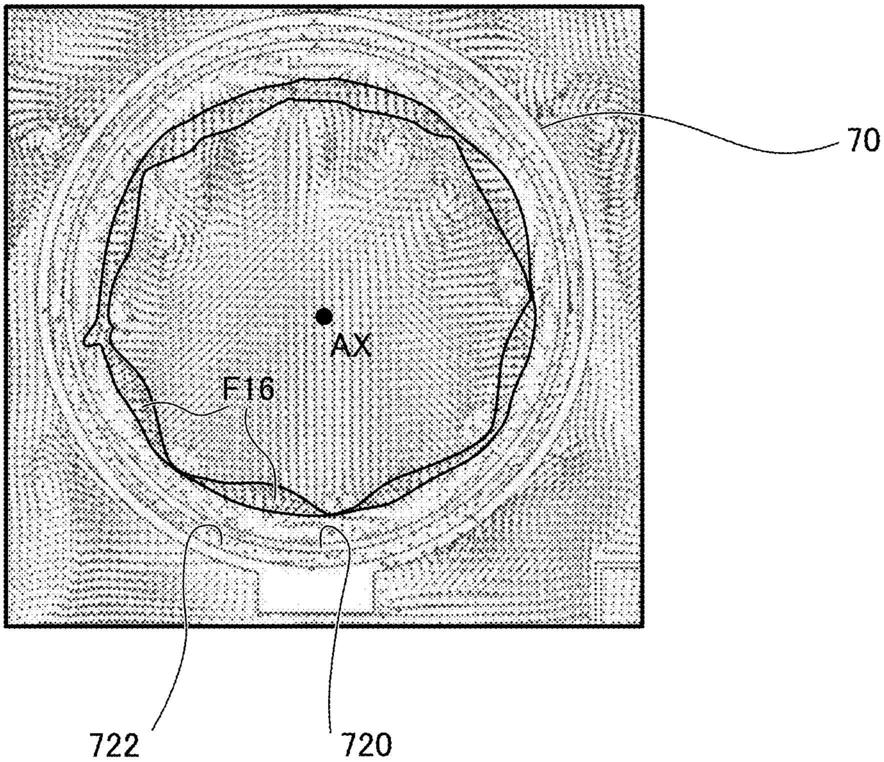
FIG. 5 is a second explanatory view showing the results of a fluid simulation using the laser welding apparatus of the present embodiment.

FIG. 5 is a second explanatory view showing a result of performing a fluid simulation using the laser welding apparatus 100 of this embodiment. In FIG. 5, the simulation results in a top view of the housing 70 is shown. Specifically, the result of simulation of the flow velocity when the position including the first blowing portion 720 viewed along the central axis AX is shown. A display method of the flow velocity in the simulation result is omitted because it is similar to FIG. 4. In FIG. 5, similarly to FIG. 4, for convenience of explanation, a portion where the flow velocity is from the fastest to the fifth fastest stage speed are illustrated by enclosing a solid line.

As shown in FIG. 5, the fast flow velocity area is generated by the airflow flowing in the directional F16 blown out from the first blowing portion 720 to the inner space SP of the housing 70. According to the simulation result, the flow velocity is fast region is substantially uniform size over the entire peripheral portion of the inner space SP, the airflow AR11 from the first blowing portion 720 to the inner space SP is blown at substantially uniform pressure and flow rate.

According to the simulation results shown in FIGS. 4 and 5, the following can be understood.

(1) As shown in FIG. 4, the inner space SP of the housing 70 is covered by an airflow AR12 with a high flow velocity. Thus, it is possible to suppress or prevent foreign matter such as spatter and/or fume from entering the inner space SP of the housing 70.

(2) As shown in FIGS. 4 and 5, in the inner space SP of the housing 70, the entire protective glass 54 is covered by airflow AR11 of substantially uniform pressure and flow velocity. Thus, it is possible to suppress or prevent the foreign matter such as spatter and/or fume from colliding with the protective glass 54 even when it enters the inner space SP of the housing 70.

(3) As shown in FIG. 4, the airflow AR11 and the airflow AR12 has a substantially line-symmetrical shapes with respect to the central axis AX, generates a stable airflow with a uniform flow velocity distribution.

(4) It is possible to suppress that the airflow AR2 blown out from the first airflow generating unit 62 disturbs the airflow near the housing 70 in the airflow AR12 and airflow AR11.

Figure 6:
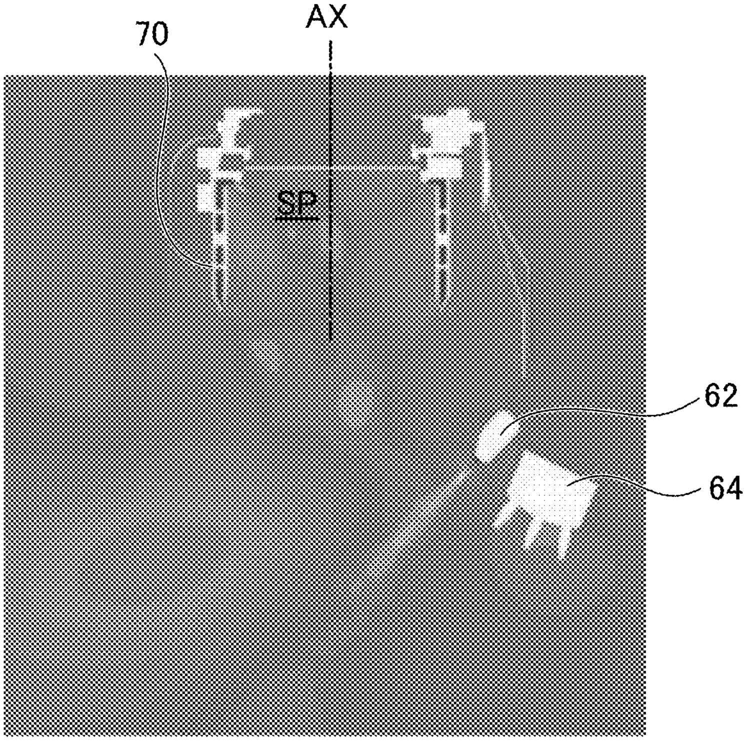
FIG. 6 is a third explanatory view showing the results of a fluid simulation using the laser welding apparatus of the present embodiment.

FIG. 6 is a third explanatory view showing a result of performing a fluid simulation using the laser welding apparatus 100 of this embodiment. In FIG. 6, the simulation results in a cross-sectional view of the housing 70 in the laser welding apparatus 100 is shown. In the simulation, the distribution of pressures (in units, e.g. "Pa") is shown in 20 steps by the difference in color. For example, a point where the pressure is equal to the atmospheric pressure is indicated in green, a point where the pressure is higher than the atmospheric pressure, that is, a point where the positive pressure is indicated in red, and a point where the negative pressure is indicated in blue. In the simulation result shown in FIG. 6, substantially the entire area in the vicinity of the inner space SP and the housing 70 shows a green, the region of the positive pressure and the region of the negative pressure is almost no. It was confirmed that the atmospheric pressure is stable in the inner space SP and the vicinity of the housing 70.

Figure 7:
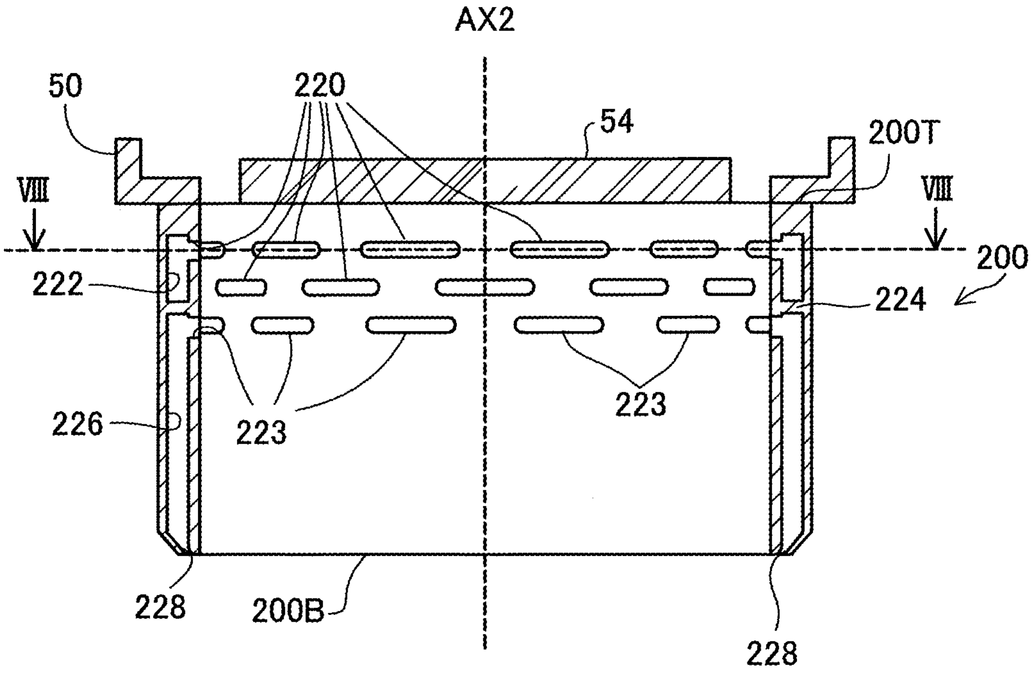
FIG. 7 illustrates an internal configuration of the housing as a comparative example in a cross-section.

With reference to from FIGS. 7 to 10, the results of the fluid simulation of the housing 200 as a comparative example will be described. FIG. 7 illustrates an internal configuration of the housing 200 as a comparative example in a cross-sectional view. The housing 200 is different from the housing 70 provided in the laser welding apparatus 100 of this embodiment, in that the configuration of the blowing portion is different, the other configurations are the same as the housing 70.

The housing 200 includes a first supply passage 222, a plurality of first blowing portion 220, the partition wall 224, a second supply passage 226, a second blowing portion 228, and a plurality of third blowing portion 223. The first supply passage 222 and the second supply passage 226 are band-shaped spaces formed along the circumferential direction in the inside of the housing 200, air from the air supply unit 60 is introduced. The first supply passage 22, and the second supply passage 226 are separated from each other by a partition wall 224. Four first gas inlets 230, configured similarly to the first gas inlet 74, are connected to the first supply passage 222. Four second gas inlet 76, configured similarly to the second gas inlet 76 are connected to the second supply passage 226. Incidentally, in the first supply passage 222 and the second supply passage 226, the distribution portion is not formed.

The first blowing portion 220 communicating with the first supply passage 222 blows out the air supplied to the first supply passage 222 toward the inner space of the housing 200. The first blowing portion 220, unlike the first blowing portion 720, is arranged at a position spaced from the first end 200T. The upper and lower surfaces constituting the first blowing portion 220 is not inclined. The third blowing portion 223 communicates with the second supply passage 226 blows out the air supplied to the second supply passage 226 toward the internal space. The upper surface and the lower surface defining the first blowing portion 220 and the third blowing portion 223 is not inclined. The first blowing portion 220 and the third blowing portion 223 has an elongated shape along the circumferential direction, respectively. The second blowing portion 228 is provided over the entire periphery of the second end 200B. The second blowing portion 228 is a single opening of the so-called slit-shaped. The second blowing portion 228 blows out the gas from the second end 200B toward the outside of the housing 200.

Figure 8:
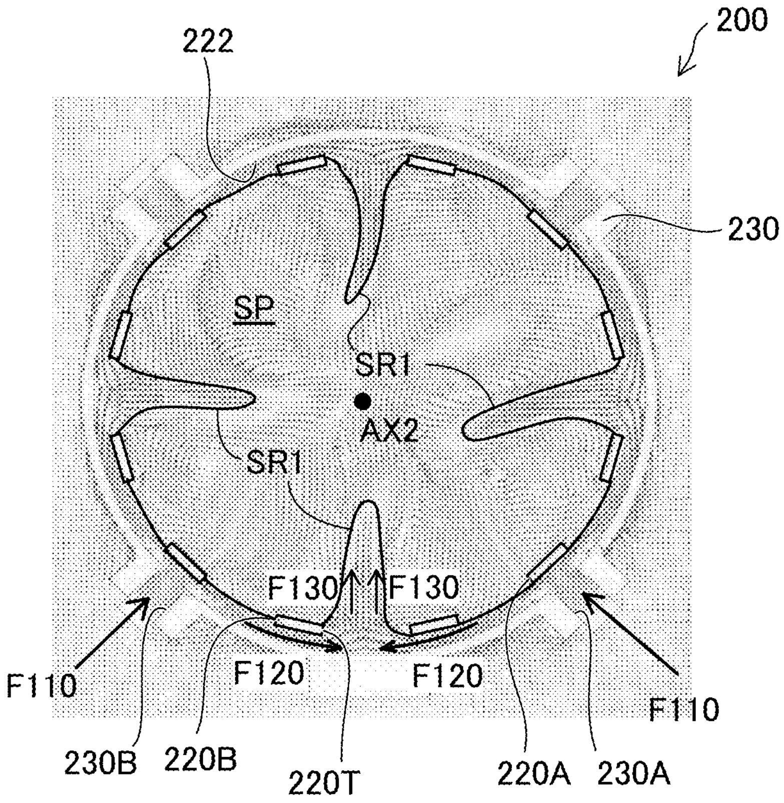
FIG. 8 is an first explanatory diagram showing the results of a fluid simulation using the housing as a comparative example.

FIG. 8 illustrates a result of a fluid simulation using the housing 200 as a comparative example. In FIG. 8, the simulation of the flow velocity of the fluid when viewed VIII-VIII position of FIG. 7 along the central axis AX2 is shown. A display method of the flow velocity in the simulation result is omitted because it is similar to FIG. 4. In FIG. 8, similarly to FIG. 4, for convenience of explanation, the portion where the flow velocity is from the fastest to the fifth fastest stage speed are illustrated by enclosing a solid line. As shown in FIG. 8, in the inner space of the housing 200, the airflow SR1 flowing fast velocity is generated.

As shown in the direction F110 in FIG. 8, the air introduced from the first gas inlet 230A collides with the surface of the first supply passage 222, for example, flows toward the direction F120 along the surface of the first supply passage 222. The air flowing in the direction F120 although reaching the first gas inlet 230A near the first gas inlet 220A, is not blown out from the first gas inlet 220A, continues to flow along the direction F120. The air flowing along the direction F120 is introduced from the other first gas inlet 230B adjacent, collides with the air passing through the first outlet 220B while flowing in the direction F120 at the position in the vicinity of the first outlet 220T, which is located midway between the first gas inlet 230A and 230B. Consequently, the flow direction of the air is switched to the direction F130, the air becomes the air flow SR1 blown from the first outlet 220T. Incidentally, it shows the same simulation results in the second supply passage 226 and the third blowing portion 223.

Figure 9:
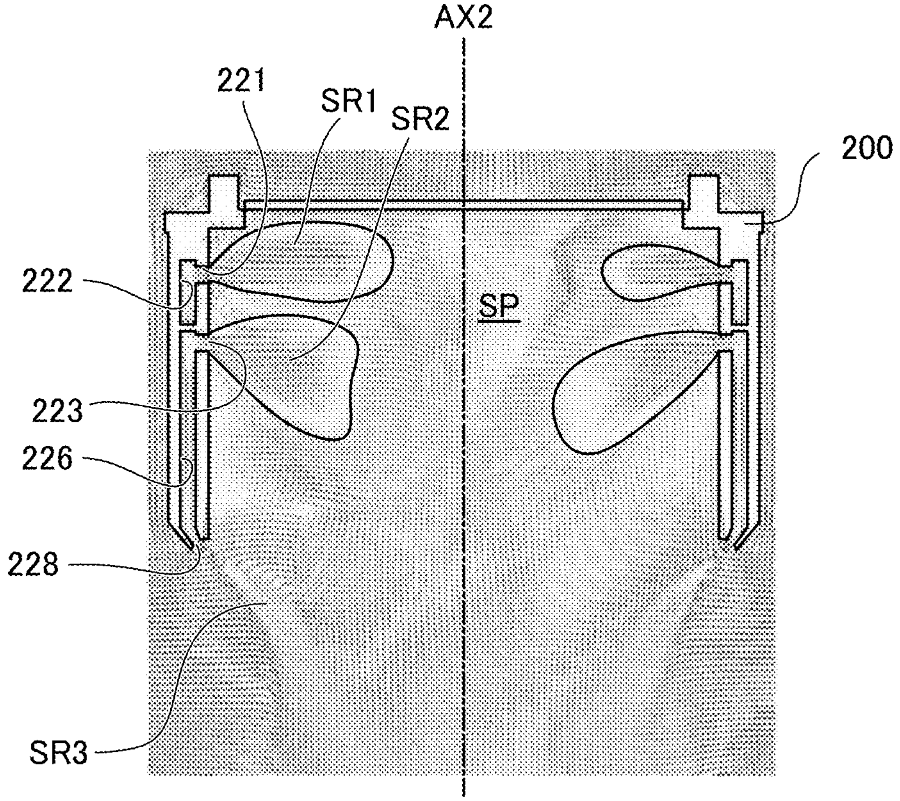
FIG. 9 is a second explanatory view showing the results of a fluid simulation using the housing as a comparative example.

FIG. 9 is a second explanatory view showing a result of a fluid simulation using the housing 200 as a comparative example. In FIG. 9, simulation results in a cross-sectional view of the housing 200 is shown. The display method of the flow velocity in the simulation result is omitted because it is similar to FIG. 4. In FIG. 9, for convenience of explanation, a portion where the flow velocity is from the fastest to the fifth fastest stage speed are illustrated by enclosing a solid line.

According to the simulation results shown in FIG. 9, the following can be understood.

(1) And airflow SR1 blown out from the first blowing portion 220, and the airflow SR2 blown out from the third blowing portion 223 is generated. Airflow SR1 and airflow SR2 do not cover the protective glass 54.

(2) Flow rate of the airflow SR3 blown out from the second blowing portion 228 is slower than the airflow SR1 and airflow SR2.

Figure 10:
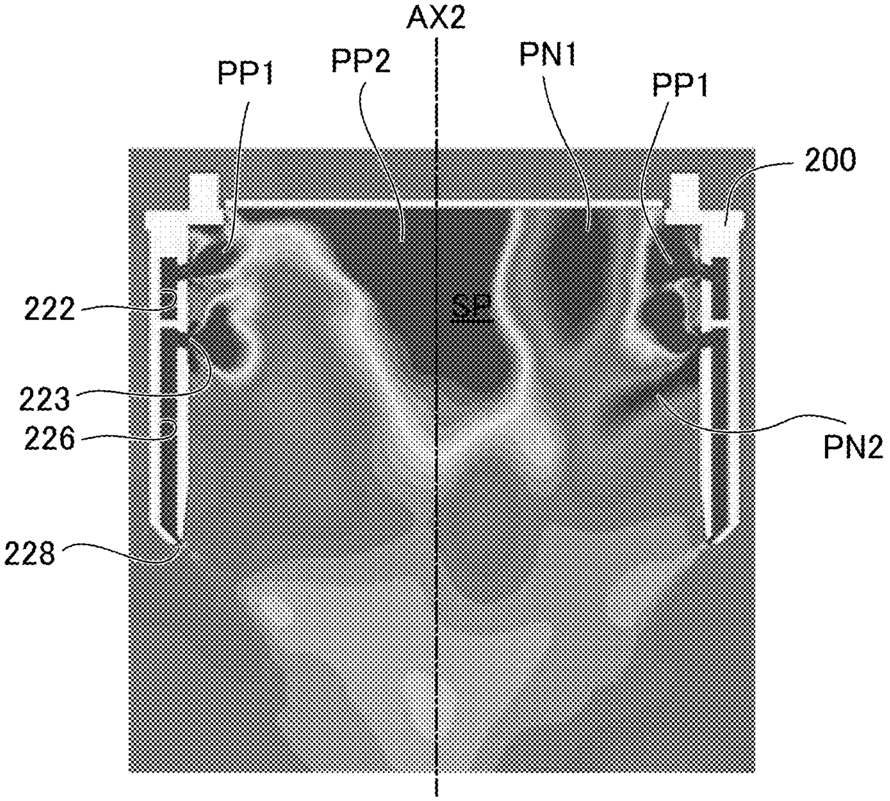
FIG. 10 is a third explanatory view showing the results of a fluid simulation using the housing as a comparative example.

FIG. 10 is a third explanatory view showing a result of a fluid simulation using the housing 200 as a comparative example. In FIG. 10, the pressure distribution in a cross-sectional view of the housing 200 is shown. Display method of the pressure distribution in the simulation result is omitted because it is the same as in FIG.

As shown in FIG. 10, according to the simulation results, it could be confirmed that a range PP1, PP2 indicating a positive pressure and a range PN1, PN2 indicating a negative pressure exist in the inner space of the housing 200. Positive pressure in the range PP1 is generated by the airflow SR1, SR2 blown out from the first blowing portion 220 and the third blowing portion 223. It is presumed that the positive pressure in the range PP2 and the negative pressure in the range PN1, PN2 are generated due to the airflow SR1, SR2 that is unevenly generated in the inner space of the housing 200. As in the range PN1, PN2 shown in FIG. 10, the negative pressure generated in the inner space of the housing 200 may be a factor for sucking foreign matter such as spatter and/or fume and colliding the foreign matter with the protective glass 54. Further, as shown in FIG. 9, since the flow velocity of the airflow SR3 is slow, it is difficult to suppress or prevent the foreign matter from entering the inner space of the housing 200.

Figure 11:
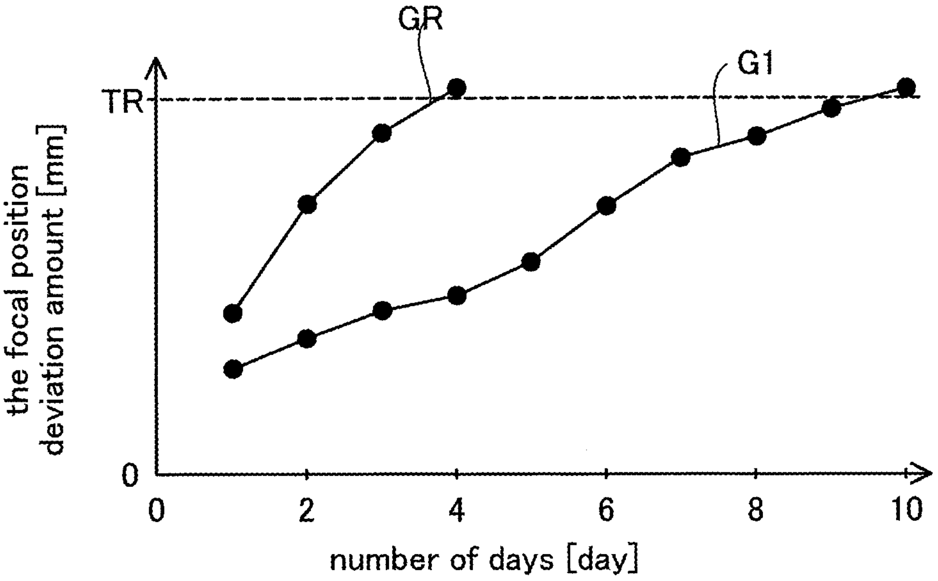
FIG. 11 illustrates the evaluation result of the focal position deviation amount in the laser welding apparatus and a laser welding apparatus having a housing as a comparative example.

FIG. 11 illustrates the evaluation result of the focal position deviation amount in the laser welding apparatus 100 and a laser welding apparatus having a housing 200 as a comparative example. In the graph shown in FIG. 11, the vertical axis represents the focal position deviation (units: mm), the horizontal axis represents the operating days of the laser-welding apparatus. Graph GR shown in FIG. 11 shows the evaluation results by the laser welding apparatus comprising a housing 200 as a comparative example. Graph G1 shows the evaluation results by the laser welding apparatus 100 of the present embodiment. The deviation of the focal length may occur due to the thermal lens effect, as described above. That is, the deviation amount of the focal length may be increased as the adhesion amount of the foreign material to the protective glass 54 is increased.

The deviation of the focal position, for example, can be derived by measuring the intensity of the reflected light from the work WK of the laser beam. Specifically, first, the intensity of the reflected light by irradiating a laser beam to the work WK at a focal length predetermined is measured as a starting position of the measurement. Next, the intensity of the reflected light from the work WK while shifting the focal length at predetermined intervals is measured. The position where the intensity of the reflected light peaks indicates the current focal length. Therefore, the deviation amount of the focal position can be calculated by determining the difference between the focal length obtained the detected peak intensity and the focal length predetermined.

The threshold TR shown in FIG. 11 is an allowable upper limit of the deviation amount of the focal position required for the laser welding apparatus 100. It is required to replace the protective glass 54 when the focal position deviation amount is equal to or greater than the threshold TR. As shown in the graph GR, in the housing 200 as a comparative example, the inclination of increasing the deviation amount of the focal position with respect to the number of working days is large. This means that the speed at which foreign matters adhere to the protective glass 54 is high. In the housing 200, the deviation amount of the focal position when the number of operating days reaches 4 days exceeds the threshold TR. In contrast, in the laser welding apparatus 100 of this embodiment, as shown in the graphical G1, the deviation of the focal length at the time when the operating days reaches 10 days exceeds the threshold TR. That is, according to the experimental results shown in FIG. 11, the laser welding apparatus 100 of the present embodiment, as compared with the case comprising a housing 200 as a comparative example, foreign matter such as spatter and fume can reduce the rate of adhering to the protective glass 54. Specifically, the replacement frequency of the protective glass 54 can be reduced to 1/2.5.

As described above, according to the Laser welding apparatus 100 of this embodiment, the housing 70 is provided over the entire circumference of the inner side of the first end 70T, toward the central axis AX of the housing 70 It is provided with a first blowing portion 720 for blowing air. Air from the entire inner circumference of the first end 70T through the first blowing portion 720 toward the inner space SP of the housing 70 is blown. Therefore, it is possible to generate an airflow covering the protective glass 54 in the inner space SP of the housing 70, even when foreign matter such as spatter and/or fume has entered the inner space SP of the housing 70 it can be suppressed or prevented from colliding with the protective glass 54. It is possible to generate an airflow of substantially uniform flow velocity over the entire peripheral portion of the inner space SP. Consequently, it is possible to stabilize the atmospheric pressure in the inner space SP of the housing 70, it is possible to suppress or prevent the foreign matter is guided to the inner space SP.

According to the laser welding apparatus 100 of this embodiment, provided over the entire circumference of the interior of the housing 70 includes a first supply passage 722 for supplying air to the first blowing portion 720. Therefore, a flow path for directing air efficiently to the first blowing portion 720 can be provided by using the housing 70.

According to the laser welding apparatus 100 of this embodiment, the housing 70 further includes four first gas inlet 74 for introducing air from a plurality of positions in the housing 70 to the first supply passage 722. By introducing air from a plurality of positions with respect to the first supply passage 722, as compared with the case where air is introduced from the first gas inlet 74 of the single number to the first supply passage 722, the pressure variation of the first supply passage 722 can be suppressed.

According to the laser welding apparatus 100 of this embodiment, the first supply passage 722 includes a plurality of shunting portions for shunting air. Therefore, it is possible to guide the air in a desired direction by a simple structure as compared with the case of providing a groove-shaped flow path and/or providing a pipe at the inside of the housing 70.

According to the Laser welding apparatus 100 of the present embodiment, the first supply passage 722, a first distribution portion 721 arranged in the vicinity of each of the plurality of first gas inlet 74, a first gas inlet 74A of the plurality of first gas inlet 74, adjacent to the first gas inlet 74A and a second distribution portion 723 arranged between the other first gas inlet 74B is provided. The first distribution portion 721 causes the gas introduced from the plurality of first gas inlet 74 to flow toward the circumferential DR of the housing 70. Therefore, the air introduced from the first gas inlet 74 to the first supply passage 722, it is possible to flow toward the circumferential DR. Air flowing toward the circumferential DR can be made to collide with each other air introduced from the first gas inlet 74A,74B adjoining, can be diffused by the second distribution portion 723. Therefore, according to the laser welding apparatus 100 of this embodiment, for example, as compared with the case where the first distribution portion 721 and the second distribution portion 723 is not provided, the pressure and flow velocity of the air flowing through the first supply passage 722 can be homogenized by dispersing the air flowing through the first supply passage 722.

According to the laser welding apparatus 100 of the present embodiment, the first supply passage 722 further includes a third distribution portion 725 arranged at the boundary between and the first supply passage 722 and the first blowing portion 720 between the first distribution portion 721 and the second distribution portion 723. Air introduced from the first gas inlet 74A,74B adjoining to each other collides the air diffused by the second distribution portion 723 can be fed into the first blowing portion 720 after further dispersed. Therefore, as compared with when not provided with the third distribution portion 725, the pressure and flow velocity of the air blown out from the first blowing portion 720 can be equalize over the entire peripheral portion of the first end 70T.

According to the Laser welding apparatus 100 of the present embodiment, the first blowing portion 720 is inclined so as to blow out gas toward any position of 50% or more and 80% or less of the distance from the second end 70B to the first blowing portion 720 in the central-axis AX of the housing 70. Therefore, while colliding with each other on the central axis AX while inclined airflow blown out from the first blowing portion 720, it is possible to flow toward the second end 70B airflow after the collision. Therefore, it is possible to suppress the occurrence of local negative pressure in the inner space SP of the housing 70.

According to the Laser welding apparatus 100 of this embodiment, the first blowing portion 720 is inclined so as to blow out gas toward the position PT of 70% of the distance from the second end 70B to the first blowing portion 720 in the central axis AX of the housing 70. Therefore, it is possible to reliably suppress the generation of local negative pressure in the inner space SP of the housing 70.

According to the Laser welding apparatus 100 of the present embodiment, the housing 70 is further arranged over the entire circumference of the second end 70B, the direction component and the second end 70B toward the central axis AX from the second end 70B toward the laser scanner 50 and a second blowing portion 728 for blowing gas toward the direction F10 defined by the direction component. The air blown out from the second blowing portion 728 can cover the inner space SP of the housing 70, foreign matter such as spatter and/or fume can be suppressed or prevented from entering the inner space SP of the housing 70. Further, it is possible to generate an airflow of substantially uniform flow velocity from the entire peripheral portion of the second end 70B. Consequently, the atmospheric pressure in the vicinity of the inner space SP of the housing 70 is stabilized, it is possible to suppress the air flow in the inner space SP of the housing 70 is disturbed.

According to the laser welding apparatus 100 of this embodiment, the housing 70 is further arranged over the entire circumference of the interior of the housing 70, and a second supply passage 726 for supplying air to the second blowing portion 728. Therefore, it is possible to provide a flow path for directing air efficiently to the second blowing portion 728 by using the housing 70.

According to the laser welding apparatus 100 of the present embodiment, the housing 70 further includes four second gas inlet 76 for introducing gas from a plurality of positions in the housing 70 to the second supply passage 726. By introducing air from a plurality of positions to the second supply passage 726, as compared with the case where air is introduced from the second gas inlet of the singular number to the second supply passage 726, the pressure variation of the second supply passage 726 can be suppressed.

According to the Laser welding apparatus 100 of this embodiment, the second supply passage 726 is arranged in the vicinity of each of the plurality of second gas inlet 76, a fourth distribution portion 727 for flowing toward the circumferential DR of the housing 70 the gas introduced from the plurality of second gas inlet 76, a first of the plurality of second gas inlet 76 a second gas inlet 76A, and a fifth distribution portion 729 arranged between the second gas inlet 76B adjacent to the second gas inlet 76A. The fourth distribution portion 727 introduced the air from the second gas inlet 76 to the second supply passage 726, it is possible to flow toward the circumferential DR. Further, by impinging the air flowing toward the circumferential DR, it can be diffused by the fifth distribution portion 729. Therefore, according to the laser welding apparatus 100 of the present embodiment, as compared with the case where the fourth distribution portion 727 and the fifth distribution portion 729 is not provided, it is possible to stabilize the pressure and flow rate of the air flowing through the second supply passage 726.

According to the laser welding apparatus 100 of this embodiment, the opening area of the second blowing portion 728 is smaller than the opening area of the first blowing portion 720. The airflow blown out from the second blowing portion 728 can be a high-speed high-pressure than the airflow blown out from the first blowing portion 720, it is possible to cover the inner space SP of the housing 70 in the airflow AR12 of the high-speed high-pressure. Thus, it is possible to more reliably suppress or prevent foreign matter such as spatter and/or fume from entering the inner space SP of the housing 70.

According to the Laser welding apparatus 100 of this embodiment, a first airflow generating unit 62 is arranged at spaced from the second end 70B of the housing 70, generating an air flow in a direction intersecting the optical path LZ of the laser beam. Sputters scattered from the processing point W0 on the work WK can be pushed by the air flow from the first airflow generating unit 62, it is possible to suppress or prevent the sputters reach the laser scanner 50.

According to the Laser welding apparatus 100 of this embodiment, the first airflow generating unit 62 is arranged at spaced from the second end 70B of the housing 70 by a distance L2 which is equal to or more the length L1 along the central axis AX of the housing 70. Thus, it is possible to suppress the air flow generated in the inner space SP of the housing 70 is disturbed by the air flow blown out from the first airflow generating unit 62.

B. Other Embodiments (B1) In the above embodiment has been described with reference to a laser welding apparatus 100 as an example of a laser beam machine. In contrast, the laser beam machine is not limited to the laser welding apparatus 100, may be a laser beam machine of various applications such as marking, cutting by a laser, drilling.

(B2) In the above embodiment, an example in which the housing 70 and the laser scanner 50 are separate. In contrast, the housing 70 and the laser scanner 50, for example, may be integrally formed as a single housing. In this instance, the boundary between the protective glass 54 and the interior space SP can be the first end 70T of the housing 70, for example.

(B3) In the above embodiment, the housing 70 includes a first gas inlet 74, a first supply passage 722, together with the first blowing portion 720, the second gas inlet 76, the second supply passage 726, and an example comprising a second blowing portion 728 is shown. In contrast, for example, when such adhesion of foreign matter to the protective glass 54 can be sufficiently suppressed by a first gas inlet 74, a first supply passage 722, and the first blowing portion 720, the second gas inlet 76, the second supply passage 726, and the second blowing portion 728 can also be omitted.

(B4) In the first embodiment, the first supply passage 722 and the second supply passage 726, an example in which a plurality of distribution portions are formed. In contrast, the distribution portion may not be provided in the first supply passage 722 and the second supply passage 726. The first supply passage 722 and the second supply passage 726 may be formed in a groove shape along the flow path of the air described above. According to the laser welding apparatus 100 configured in this way, the gas supplied to the first supply passage 722 and the second supply passage 726 can be guided to the desired position of the first blowing portion 720.

The present disclosure is not limited to the embodiments described above and is able to be realized with various configurations without departing from the spirit thereof. For example, technical features in the embodiments may be replaced with each other or combined together as necessary in order to solve part or the whole of the problems described previously or to achieve part or the whole of the effects described previously. When the technical features are not described as essential features in the present specification, they are able to be deleted as necessary. For example, the present disclosure may be realized with embodiments which will be described below.

(1) According to one aspect of the present disclosure, a laser beam machine is provided. The laser beam machine includes: a laser emitting system for emitting a laser beam, wherein the laser emitting system has a protective glass capable of transmitting the laser beam; and a housing attached to the laser emitting system. the housing includes, a first end facing the laser emitting system, a second end opposite to the first end, and a first blowing portion located over an entire circumference of an interior of the first end, and wherein the first blowing portion blows a gas toward a central axis of the housing.

According to the laser beam machine of this aspect, it is possible to generate an airflow covering the protective glass in the inner space of the housing, it can be suppressed or prevented from foreign matter such as spatter and/or fume collides with the protective glass.

(2) The laser beam machine of the aspect described above, the housing may further include a first supply passage located over the entire circumference of an inside of the housing. the first supply passage may supply a gas to the first blowing portion.

According to the laser beam machine of this aspect, a flow path for directing air efficiently to the first blowing portion can be provided by using the housing.

(3) The laser beam machine of the aspect described above, the housing may further include a plurality of first gas inlets for introducing a gas into the first supply passage.

According to the laser beam machine of this aspect, by introducing air from a plurality of positions with respect to the first supply passage, as compared with the case where air is introduced from the first gas inlet of the single number to the first supply passage, the pressure variation of the first supply passage can be suppressed.

(4) The laser beam machine of the aspect described above, the first supply passage may include a plurality of distribution portions for dividing a gas flow.

According to the laser beam machine of this aspect, it is possible to guide the air in a desired direction by a simple structure as compared with the case of providing a groove-shaped flow path and/or providing a pipe at the inside of the housing.

(5) The laser beam machine of the aspect described above, the plurality of distribution portions may include a first distribution portion and a second distribution portion. The first distribution portion may be located in vicinity of each of the plurality of first gas inlets in the first supply passage, the first distribution portion is configured to flow a gas toward a circumferential direction of the housing, the gas toward a circumferential direction of the housing is introduced from the plurality of first gas inlets. The second distribution portion may be located between a one of the plurality of first gas inlets and an another of the plurality of first gas inlets.

According to the laser beam machine of this aspect, as compared with the case where the first distribution portion and the second distribution portion is not provided, the pressure and flow velocity of the air flowing through the first supply passage can be homogenized.

(6) The laser beam machine of the aspect described above, the plurality of distribution portion may further include a third distribution portion. The third distribution portion may be located between the first distribution portion and the second distribution portion in the first supply passage.

According to the laser beam machine of this aspect, as compared with when not provided with the third distribution portion, the pressure and flow velocity of the air blown out from the first blowing portion can be equalize over the entire peripheral portion of the first end.

(7) The laser beam machine of the aspect described above, the first blowing portion may be configured to blow a gas toward a position in the central axis of the housing. The position may be arranged between a position of 50% of a distance from the second end to the first blowing portion and a position of 80% of the distance.

According to the laser beam machine of this aspect, it is possible to suppress the occurrence of local negative pressure in the inner space of the housing.

(8) The laser beam machine of the aspect described above, the position in the central axis of the housing may be a position that is 70% of the distance from the second end to the first blowing portion.

According to the laser beam machine of this aspect, it is possible to reliably suppress the generation of local negative pressure in the inner space of the housing.

(9) The laser beam machine of the aspect described above, the housing may further include a second blowing portion. The second blowing portion may be located over the entire circumference of the second end, the second blowing portion blows a gas toward a side opposite to the laser emitting system from the second end.

According to the laser beam machine of this aspect, the air blown out from the second blowing portion can cover the inner space of the housing, foreign matter such as spatter and/or fume can be suppressed or prevented from entering the inner space of the housing.

(10) The laser beam machine of the aspect described above, the housing may further include a second supply passage located over the entire circumference of an inside of the housing. The second supply passage may supply a gas to the second blowing portion.

According to the laser beam machine of this aspect, it is possible to provide a flow path for directing air efficiently to the second blowing portion by using the housing.

(11) The laser beam machine of the aspect described above, the housing may further include a plurality of second gas inlets for introducing a gas into the second supply passage.

According to the laser beam machine of this aspect, by introducing air from a plurality of positions to the second supply passage, as compared with the case where air is introduced from the second gas inlet of the singular number to the second supply passage, the pressure variation of the second supply passage can be suppressed.

(12) The laser beam machine of the aspect described above, the second supply passage may include a fourth distribution portion and a fifth distribution portion. The fourth distribution portion may be located in a vicinity of each of the plurality of second gas inlets in the second supply passage, the fourth distribution portion is configured to flow a gas toward a circumferential direction of the housing, the gas is introduced from the plurality of second gas inlets. The fifth distribution portion may be located between a one of the plurality of second gas inlets and an another of the plurality of second gas inlets.

According to the laser beam machine of this aspect, as compared with the case where the fourth distribution portion and the fifth distribution portion is not provided, it is possible to stabilize the pressure and flow rate of the air flowing through the second supply passage.

(13) The laser beam machine of the aspect described above, an opening area of the second blowing portion may be smaller than an opening area of the first blowing portion.

According to the laser beam machine of this aspect, it is possible to cover the inner space of the housing in the airflow of the high-speed high-pressure. Thus, it is possible to more reliably suppress or prevent foreign matter such as spatter and/or fume from entering the inner space of the housing.

(14) The laser beam machine of the aspect described above may further include an airflow generating unit located at a position away from the housing. The airflow generating unit may generate an air flow in a direction intersecting the central axis of the housing.

According to the laser beam machine of this aspect, sputters scattered from the processing point on the work can be pushed by the air flow from the first airflow generating unit, it is possible to suppress or prevent the sputters reach the laser scanner.

(15) The laser beam machine of the aspect described above, the airflow generating unit may be located at a position away from the housing by a distance of a length of the housing along the central axis or more than the length of the housing along the central axis.

According to the laser beam machine of this aspect, it is possible to suppress the air flow generated in the inner space of the housing is disturbed by the air flow blown out from the first airflow generating unit.

The present disclosure may also be realized in various forms other than the laser beam machine. For example, the present disclosure may be realized in the forms of a housing used in the laser beam machine, a method of manufacturing a laser beam machine, a method of manufacturing a housing, a laser processing method, an air flow generating method and the like.

What is claimed is:

1. A laser beam machine comprising:

a laser emitting system for emitting a laser beam, wherein the laser emitting system has a protective glass capable of transmitting the laser beam; and a housing attached to the laser emitting system, wherein the housing comprises a cylindrical shape and is arranged to surround an optical path of the laser beam emitted from the laser emitting system, wherein the housing further comprises:

a first end facing the laser emitting system;

a second end opposite to the first end;

a first blowing portion comprising a first slit-shaped opening located over an entire circumference of an interior of the first end, wherein the first slit-shaped opening blows a gas toward a central axis of the housing;

a first supply passage located over the entire circumference of an inside of the housing, wherein the first supply passage supplies the gas to the first blowing portion;

a plurality of first gas inlets for introducing the gas into the first supply passage, wherein the first supply passage comprises a plurality of distribution portions for dividing a gas flow, wherein the plurality of distribution portions comprises a first distribution portion and a second distribution portion, wherein the first distribution portion is located in vicinity of each of the plurality of first gas inlets in the first supply passage, the first distribution portion is configured to flow the gas toward a circumferential direction of the housing, wherein the gas flowed toward the circumferential direction of the housing is introduced from the plurality of first gas inlets, wherein the second distribution portion is located between one of the plurality of first gas inlets and another of the plurality of first gas inlets, and wherein the first distribution portion and the second distribution portion are each provided on an inner wall of the first supply passage and have a protrusion that projects radially outward from the inner wall, the protrusion being elongated along the circumferential direction of the housing.

2. The laser beam machine according to claim 1, wherein the plurality of distribution portions further comprises a third distribution portion, wherein the third distribution portion is located between the first distribution portion and the second distribution portion in the first supply passage.

3. The laser beam machine according to claim 1, wherein the first blowing portion is configured to blow the gas toward a position in the central axis of the housing, the position is arranged between a position of 50% of a distance from the second end to the first blowing portion and a position of 80% of the distance.

4. The laser beam machine according to claim 3, wherein the position in the central axis of the housing is a position that is 70% of the distance from the second end to the first blowing portion.

5. The laser beam machine according to claim 1, wherein the housing further comprises a second blowing portion, wherein the second blowing portion has a second slit-shaped opening located over the entire circumference of the second end, and the second slit-shaped opening blows the gas toward a side opposite to the laser emitting system from the second end.

6. The laser beam machine according to claim 5, wherein the housing further comprises a second supply passage located over the entire circumference of an inside of the housing, wherein the second supply passage supplies the gas to the second blowing portion.

7. The laser beam machine according to claim 6, wherein the housing further comprises a plurality of second gas inlets for introducing the gas into the second supply passage.

8. The laser beam machine according to claim 7, wherein the second supply passage comprises a fourth distribution portion and a fifth distribution portion, wherein the fourth distribution portion is located in a vicinity of each of the plurality of second gas inlets in the second supply passage, the fourth distribution portion is configured to flow the gas toward the circumferential direction of the housing, wherein the gas is introduced from the plurality of second gas inlets, and wherein the fifth distribution portion is located between one of the plurality of second gas inlets and another of the plurality of second gas inlets.

9. The laser beam machine according to claim 1, wherein an opening area of the second blowing portion is smaller than an opening area of the first blowing portion.

10. The laser beam machine according to claim 1, further comprising:

an airflow generating unit located at a position away from the housing, and wherein the airflow generating unit generates an air flow in a direction intersecting the central axis of the housing.

11. The laser beam machine according to claim 10, wherein the airflow generating unit is located at a position away from the housing by a distance of a length of the housing along the central axis or more than the length of the housing along the central axis.

12. The laser beam machine of claim 1, wherein the first slit-shaped opening of the first blowing portion comprises an upper surface and a lower surface facing the upper surface, and wherein an angle of the upper surface with respect to a longitudinal axis of the housing can be adjusted to change a flow direction of the gas blown out from the first blowing portion.

13. The laser beam machine of claim 1, wherein the first slit-shaped opening of the first blowing portion is angled to blow the gas in an inclined direction from the first end to the second end.

* * * * *